United States Patent
Bloch et al.

(10) Patent No.: US 9,257,148 B2
(45) Date of Patent: Feb. 9, 2016

(54) SYSTEM AND METHOD FOR SYNCHRONIZATION OF SELECTABLY PRESENTABLE MEDIA STREAMS

(71) Applicant: JBF Interlude 2009 Ltd-Israel, Tel Aviv (IL)

(72) Inventors: Yoni Bloch, Brooklyn, NY (US); Tal Zubalsky, Tel Aviv-Yafo (IL); Barak Feldman, Tenafly, NJ (US)

(73) Assignee: JBF Interlude 2009 LTD (IL)

( * ) Notice: Subject to any disclaimer, the term of this patent is extended or adjusted under 35 U.S.C. 154(b) by 322 days.

(21) Appl. No.: 13/838,830

(22) Filed: Mar. 15, 2013

(65) Prior Publication Data

US 2014/0270680 A1  Sep. 18, 2014

(51) Int. Cl.
*H04N 5/935* (2006.01)
*G11B 27/11* (2006.01)

(52) U.S. Cl.
CPC ..................................... *G11B 27/11* (2013.01)

(58) Field of Classification Search
CPC ......... H04N 5/85; G11B 27/105; G11B 27/11
USPC ............. 375/240.01; 386/278, 281, 282, 285, 386/201, 239
See application file for complete search history.

(56) References Cited

U.S. PATENT DOCUMENTS

| | | | |
|---|---|---|---|
| 5,568,602 A | 10/1996 | Callahan et al. | |
| 5,607,356 A | 3/1997 | Schwartz | |
| 5,636,036 A | 6/1997 | Ashbey | |
| 5,734,862 A | 3/1998 | Kulas | |
| 6,122,668 A | 9/2000 | Teng et al. | |
| 6,191,780 B1 | 2/2001 | Martin et al. | |
| 6,222,925 B1 | 4/2001 | Shiels et al. | |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).

(Continued)

*Primary Examiner* — Thai Tran
*Assistant Examiner* — Mishawn Hunter
(74) *Attorney, Agent, or Firm* — Goodwin Procter LLP (57) ABSTRACT

A system for synchronizing audio and video of selectably presentable multimedia content includes a memory for storing a plurality of selectably presentable multimedia content segments. Each content segment defines a portion of one or more content paths and includes a decision period during which a user may select a subsequent content segment as the content segment is playing. An assembly engine seamlessly assembles a subset of the content segments into one of the content paths, ultimately forming a multimedia presentation. A configuration manager determines an audio file and a video file to be played based on a content segment that is selected to be played immediately following the currently playing content segment. An audio engine processes the audio file for playback, and a video engine synchronizes playback of the video file with the playback of the audio file.

12 Claims, 4 Drawing Sheets

(56) References Cited

U.S. PATENT DOCUMENTS

| | | | |
|---|---|---|---|
| 6,298,482 | B1 | 10/2001 | Seidman et al. |
| 7,379,653 | B2 | 5/2008 | Yap et al. |
| 7,444,069 | B1 | 10/2008 | Bernsley |
| 7,627,605 | B1 | 12/2009 | Lamere et al. |
| 7,917,505 | B2 | 3/2011 | van Gent et al. |
| 8,065,710 | B2 | 11/2011 | Malik |
| 8,190,001 | B2 | 5/2012 | Bernsley |
| 8,600,220 | B2 | 12/2013 | Bloch et al. |
| 8,650,489 | B1 | 2/2014 | Baum et al. |
| 8,860,882 | B2 | 10/2014 | Bloch et al. |
| 9,009,619 | B2 | 4/2015 | Bloch et al. |
| 9,021,537 | B2 | 4/2015 | Funge et al. |
| 2002/0091455 | A1 | 7/2002 | Williams |
| 2002/0120456 | A1 | 8/2002 | Berg et al. |
| 2002/0177914 | A1 | 11/2002 | Chase |
| 2003/0159566 | A1 | 8/2003 | Sater et al. |
| 2003/0183064 | A1 | 10/2003 | Eugene et al. |
| 2003/0184598 | A1 | 10/2003 | Graham |
| 2003/0221541 | A1 | 12/2003 | Platt |
| 2004/0138948 | A1 | 7/2004 | Loomis |
| 2005/0055377 | A1 | 3/2005 | Dorey et al. |
| 2005/0091597 | A1 | 4/2005 | Ackley |
| 2005/0102707 | A1 | 5/2005 | Schnitman |
| 2006/0028951 | A1 | 2/2006 | Tozun et al. |
| 2006/0064733 | A1 | 3/2006 | Norton et al. |
| 2006/0150072 | A1 | 7/2006 | Salvucci |
| 2006/0155400 | A1 | 7/2006 | Loomis |
| 2006/0200842 | A1 | 9/2006 | Chapman et al. |
| 2006/0224260 | A1 | 10/2006 | Hicken et al. |
| 2007/0118801 | A1 | 5/2007 | Harshbarger et al. |
| 2007/0157261 | A1 | 7/2007 | Steelberg et al. |
| 2007/0162395 | A1 | 7/2007 | Ben-Yaacov et al. |
| 2007/0239754 | A1 | 10/2007 | Schnitman |
| 2008/0021874 | A1 | 1/2008 | Dahl et al. |
| 2008/0022320 | A1 | 1/2008 | Ver Steeg |
| 2008/0031595 | A1 | 2/2008 | Cho |
| 2008/0086754 | A1 | 4/2008 | Chen et al. |
| 2008/0091721 | A1 | 4/2008 | Harboe et al. |
| 2008/0092159 | A1 | 4/2008 | Dmitriev et al. |
| 2008/0148152 | A1 | 6/2008 | Blinnikka et al. |
| 2008/0276157 | A1 | 11/2008 | Kustka et al. |
| 2008/0300967 | A1 | 12/2008 | Buckley et al. |
| 2008/0301750 | A1 | 12/2008 | Silfvast et al. |
| 2008/0314232 | A1 | 12/2008 | Hansson et al. |
| 2009/0022015 | A1 | 1/2009 | Harrison |
| 2009/0024923 | A1 | 1/2009 | Hartwig et al. |
| 2009/0055880 | A1 | 2/2009 | Batteram et al. |
| 2009/0063681 | A1 | 3/2009 | Ramakrishnan et al. |
| 2009/0116817 | A1 | 5/2009 | Kim et al. |
| 2009/0199697 | A1 | 8/2009 | Lehtiniemi et al. |
| 2009/0228572 | A1 | 9/2009 | Wall et al. |
| 2009/0320075 | A1 | 12/2009 | Marko |
| 2010/0077290 | A1 | 3/2010 | Pueyo |
| 2010/0146145 | A1 | 6/2010 | Tippin et al. |
| 2010/0153512 | A1 | 6/2010 | Balassanian et al. |
| 2010/0161792 | A1 | 6/2010 | Palm et al. |
| 2010/0167816 | A1 | 7/2010 | Perlman et al. |
| 2010/0186579 | A1 | 7/2010 | Schnitman |
| 2010/0262336 | A1 | 10/2010 | Rivas et al. |
| 2010/0268361 | A1 | 10/2010 | Mantel et al. |
| 2010/0278509 | A1 | 11/2010 | Nagano et al. |
| 2010/0287033 | A1 | 11/2010 | Mathur |
| 2010/0287475 | A1 | 11/2010 | van Zwol et al. |
| 2010/0293455 | A1 | 11/2010 | Bloch |
| 2010/0332404 | A1 | 12/2010 | Valin |
| 2011/0007797 | A1 | 1/2011 | Palmer et al. |
| 2011/0010742 | A1 | 1/2011 | White |
| 2011/0026898 | A1 | 2/2011 | Lussier et al. |
| 2011/0096225 | A1 | 4/2011 | Candelore |
| 2011/0126106 | A1 | 5/2011 | Ben Shaul et al. |
| 2011/0131493 | A1 | 6/2011 | Dahl |
| 2011/0138331 | A1 | 6/2011 | Pugsley et al. |
| 2011/0191684 | A1 | 8/2011 | Greenberg |
| 2011/0197131 | A1 | 8/2011 | Duffin et al. |
| 2011/0200116 | A1 | 8/2011 | Bloch et al. |
| 2011/0202562 | A1 | 8/2011 | Bloch et al. |
| 2011/0246885 | A1 | 10/2011 | Pantos et al. |
| 2011/0252320 | A1 | 10/2011 | Arrasvuori et al. |
| 2011/0264755 | A1 | 10/2011 | Salvatore De Villiers |
| 2012/0005287 | A1 | 1/2012 | Gadel et al. |
| 2012/0094768 | A1 | 4/2012 | McCaddon et al. |
| 2012/0110620 | A1 | 5/2012 | Kilar et al. |
| 2012/0198412 | A1 | 8/2012 | Creighton et al. |
| 2012/0308206 | A1 | 12/2012 | Kulas |
| 2013/0046847 | A1 | 2/2013 | Zavesky et al. |
| 2013/0054728 | A1 | 2/2013 | Amir et al. |
| 2013/0055321 | A1 | 2/2013 | Cline et al. |
| 2013/0259442 | A1 | 10/2013 | Bloch et al. |
| 2014/0040280 | A1 | 2/2014 | Slaney et al. |
| 2014/0078397 | A1 | 3/2014 | Bloch et al. |
| 2014/0082666 | A1 | 3/2014 | Bloch et al. |
| 2014/0129618 | A1 | 5/2014 | Panje et al. |
| 2014/0178051 | A1 | 6/2014 | Bloch et al. |
| 2014/0270680 | A1 | 9/2014 | Bloch et al. |
| 2014/0380167 | A1 | 12/2014 | Bloch et al. |
| 2015/0067723 | A1 | 3/2015 | Bloch et al. |
| 2015/0181301 | A1 | 6/2015 | Bloch et al. |
| 2015/0199116 | A1 | 7/2015 | Bloch et al. |

FOREIGN PATENT DOCUMENTS

| | | | |
|---|---|---|---|
| EP | 2104105 | A1 | 9/2009 |
| GB | 2359916 | A | 9/2001 |
| GB | 2428329 | A | 1/2007 |
| JP | 2008005288 | A | 1/2008 |
| WO | WO-00/59224 | A1 | 10/2000 |
| WO | WO-2007/062223 | A2 | 5/2007 |
| WO | WO-2007/138546 | A2 | 12/2007 |
| WO | WO-2008/001350 | A1 | 1/2008 |
| WO | WO-2008/057444 | A2 | 5/2008 |
| WO | WO-2008052009 | A2 | 5/2008 |
| WO | WO-2009/137919 | A1 | 11/2009 |

OTHER PUBLICATIONS

Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

Archos Gen 5 English User Manual Version 3.0, Jul. 26, 2007, pp. 1-81.

International Search Report for International Patent Application PCT/IL2012/000080 dated Aug. 9, 2012 (4 pages).

International Search Report for International Patent Application PCT/IL2012/000081 dated Jun. 28, 2012 (4 pages).

International Search Report for International Patent Application PCT/IL2010/000362 dated Aug. 25, 2010 (2 pages).

Supplemental European Search Report for EP10774637.2 (PCT/IL2010/000362) mailed Jun. 20, 2012 (6 pages).

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).

Barlett, Mitch, "iTunes 11: How to Queue Next Song," Technipages, Oct. 6, 2008, pp. 1-8, retrieved on Dec. 26, 2013 from the internet http://www.technipages.com/itunes-queue-next-song.html.

Gregor Miller et al. "MiniDiver: A Novel Mobile Media Playback Interface for Rich Video Content on an iPhoneTM", Entertainment Computing A ICEC 2009, Sep. 3, 2009, pp. 98-109.

International Search Report and Written Opinion for International Patent Application PCT/IB2013/001000 mailed Jul. 31, 2013 (12 pages).

Sodagar, I., (2011) "The MPEG-DASH Standard for Multimedia Streaming Over the Internet", IEEE Multimedia, IEEE Service Center, New York, NY US, vol. 18, No. 4, pp. 62-67.

Supplemental European Search Report for EP13184145 dated Jan. 30, 2014 (6 pages).

FIG. 1

SYSTEM AND METHOD FOR SYNCHRONIZATION OF SELECTABLY PRESENTABLE MEDIA STREAMS

FIELD OF THE INVENTION

The invention relates generally to synchronizing audio and video, and more particularly to a system and method for synchronizing media streams across a plurality of selectably presentable media content segments.

BACKGROUND

Digital audio video (AV) streams or files are preferably presented to a viewer with the audio and video components in synchronization. To ensure the audio and video are played with the correct timing, the stream or file may include some form of AV-synchronization coding, such as interleaved video and audio data or relative timestamps.

Delays in audio or video relative to one another may occur for a number of reasons. Intensive video processing, such as format conversion, encoding, and decoding can result in the video stream falling behind the audio stream, which generally includes a smaller amount of data to process.

While existing methods for audio and video synchronization may alleviate timing issues occurring in the playback of an individual AV stream or file, unique problems must be overcome to ensure audio and video synchronization among and within multiple multimedia content segments that are to be seamlessly joined together. Further complications arise when a viewer has the ability to select multiple content segments to be seamlessly combined and played in real-time. Accordingly, there is a need for systems and methods to synchronize audio for selectably presentable media content segments, such that a synchronized, seamless transition in audio and video occurs between the end of one segment and the start of another.

SUMMARY OF THE INVENTION

In one aspect, a system for synchronizing audio and video of selectably presentable multimedia content includes a memory for storing a plurality of selectably presentable multimedia content segments. Each content segment defines a portion of content paths and includes a decision period during which a user may select a subsequent content segment as the content segment is playing. An assembly engine seamlessly assembles a subset of the content segments into one of the content paths, ultimately forming a multimedia presentation. A configuration manager determines an audio file and a video file to be played based on a content segment that is selected to be played immediately following the currently playing content segment. An audio engine processes the audio file for playback, and a video engine synchronizes playback of the video file with the playback of the audio file.

Processing the audio file for playback may include dividing the audio file into multiple audio samples, with each audio sample including a timestamp that indicates the time at which the audio sample should be played. Upon causing one of the audio samples to be played, a current system timestamp may be updated based on the timestamp of the played audio sample.

Synchronizing playback of the video file with the playback of the audio file may include dividing the video file into multiple video frames, with each video frame including a timestamp indicating the time at which the video frame should be played. The timestamp of at least one of the video frames may be compared with the current system timestamp, and, based on the timestamp comparison, the time for playing the video frame is determined.

In one embodiment, comparing the timestamps includes determining that the video frame timestamp is substantially close to the current system timestamp and, as a result, the video frame is immediately played.

In another embodiment, comparing the timestamps includes determining that the video frame timestamp is earlier than the current system timestamp and, as a result, the video frame is discarded. The timestamp comparison and discarding of frames may be repeated with consecutive frames until reaching a video frame having a timestamp that is substantially close to the current system timestamp. In a further embodiment, when a maximum number of video frames has been consecutively discarded, the next video frame is played irrespective of its timestamp.

In one implementation, comparing the timestamps includes determining that the video frame timestamp is later than the current system timestamp and, as a result, the video frame is delayed.

The system may include a graphical user interface manager for presenting to the user, during a decision period as a content segment is playing, visual representations of two or more alternative content segments from which the next content segment to be played may be selected by the user. Upon reaching the decision period, a visual representation of a time interval representing an amount of time permitted to select one of the alternative content segments may be presented to the user.

In some embodiments, the memory stores multiple audio files, multiple video files, and a configuration file. To determine the audio file and the video file to be played, the audio file is selected from the stored audio files based on the configuration file and a selected multimedia content segment, and the video file is selected from the stored video files based on the configuration file and the selected multimedia content segment.

In another aspect, a method of synchronizing the audio and video of selectably presentable multimedia content includes storing a plurality of selectably presentable multimedia content segments, with each content segment defining a portion of content paths. Each content segment also includes a decision period during which a user may select the next content segment to view as the current segment is playing. An audio file and a video file to be played are determined based on a selected subsequent content segment, and the selected segment is seamlessly appended the onto the currently playing content segment. The audio file is processed for playback, and playback of the video file is synchronized with the playback of the audio file.

Processing the audio file for playback may include dividing the audio file into multiple audio samples, with each audio sample including a timestamp that indicates the time at which the audio sample should be played. Upon causing one of the audio samples to be played, a current system timestamp may be updated based on the timestamp of the played audio sample.

Synchronizing playback of the video file with the playback of the audio file may include dividing the video file into multiple video frames, with each video frame including a timestamp indicating the time at which the video frame should be played. The timestamp of at least one of the video frames may be compared with the current system timestamp, and, based on the timestamp comparison, the time for playing the video frame is determined.

In one embodiment, comparing the timestamps includes determining that the video frame timestamp is substantially close to the current system timestamp and, as a result, the video frame is immediately played.

In another embodiment, comparing the timestamps includes determining that the video frame timestamp is earlier than the current system timestamp and, as a result, the video frame is discarded. The timestamp comparison and discarding of frames may be repeated with consecutive frames until reaching a video frame having a timestamp that is substantially close to the current system timestamp. In a further embodiment, when a maximum number of video frames has been consecutively discarded, the next video frame is played irrespective of its timestamp.

In one implementation, comparing the timestamps includes determining that the video frame timestamp is later than the current system timestamp and, as a result, the video frame is delayed.

During a decision period of the currently playing content segment, visual representations of two or more alternative content segments from which the subsequent content segment is selected may be presented to the user. Upon reaching the decision period, a visual representation of a time interval representing an amount of time permitted to select one of the alternative content segments may also be presented to the user.

In some embodiments, multiple audio files, multiple video files, and a configuration file are stored. To determine the audio file and the video file to be played, the audio file is selected from the stored audio files based on the configuration file and a selected multimedia content segment, and the video file is selected from the stored video files based on the configuration file and the selected multimedia content segment.

Other aspects and advantages of the invention will become apparent from the following drawings, detailed description, and claims, all of which illustrate the principles of the invention, by way of example only

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various embodiments of methods and supporting systems for synchronizing media streams, such as audio and video. The disclosed techniques may be used in conjunction with seamlessly assembled and selectably presentable multimedia content, such as that described in U.S. patent application Ser. No. 13/033,916, filed Feb. 24, 2011, and entitled "System and Method for Seamless Multimedia Assembly," the entirety of which is hereby incorporated by reference.

Selectably presentable multimedia content may include, for example, one or more separate multimedia content segments that are combined to create a continuous, seamless presentation such that there are no noticeable gaps, jumps, freezes, or other interruptions to video or audio playback between segments. In some instances, the viewer is permitted to make choices in real-time at decision points or decision periods interspersed throughout the multimedia content, resulting in the corresponding multimedia segment(s) associated with the choices to be presented to the viewer in the selected order. A decision point/period may occur at any time and in any number during a multimedia segment, including at or near the end. Two or more combined segments form a seamless multimedia content path, and there may be multiple paths that a viewer can take to experience a complete, start-to-finish, seamless presentation. Further, one or more multimedia segments may be shared among intertwining paths while still ensuring a seamless transition from a previous segment and to the next segment.

Traversal of the multimedia content along a content path may be performed by selecting among options that appear on and/or around the video while the video is playing. The segment that is played after a currently playing segment is determined based on the option selected. Each option may result in a different video and audio segment being played. The transition to the next segment may occur immediately upon selection, at the end of the current segment, or at some other predefined point. Notably, the transition between content segments may be seamless. In other words, the audio and video may continue playing regardless of whether a segment selection is made, and no noticeable gaps appear in audio or video playback between any connecting segments. In some instances, the video continues on to a following segment after a certain amount of time if none is chosen, or may continue playing in a loop.

In one example, the multimedia content is a music video in which the viewer selects options at segment decision points to determine content to be played. First, a video introduction segment is played for the viewer. Prior to the end of the segment, a decision point is reached at which the viewer may select the next segment to be played from a listing of choices. In this case, the viewer is presented with a choice as to who will sing the first verse of the song: a tall, female performer, or a short, male performer. The viewer is given an amount of time to make a selection (i.e., a decision period), after which, if no selection is made, a default segment will be automatically selected. Notably, the media content continues to play during the time the viewer is presented with the choices. Once a choice is selected (or the selection period ends), a seamless transition occurs to the next segment, meaning that the audio and video continue on to the next segment as if there were no break between the two segments and the user cannot visually or audibly detect the transition. As the music video continues, the viewer is presented with other choices at other decisions points, depending on which path of choices is followed. Ultimately, the viewer arrives at a final segment, having traversed a complete multimedia content path.

Of note, although the techniques described herein relate primarily to audio and video playback, the invention is equally applicable to various streaming and non-streaming media, including animation, video games, interactive media, and other forms of content usable in conjunction with the present systems and methods. Further, there may be more than one audio, video, and/or other media content stream played in synchronization with other streams. Streaming media may include, for example, multimedia content that is continuously presented to a viewer while it is received from a content delivery source, such as a remote video server. If a source media file is in a format that cannot be streamed and/or does not allow for seamless connections between segments, the media file may be transcoded or converted into a format supporting streaming and/or seamless transitions.

To ensure a seamless transition between multimedia content segments, as well as maintain consistency of presentation during the playback of a segment, it is important to synchronize the segment components with each other. Generally, this requires synchronization among a video stream, an audio stream, and an interactive interface. The audio and video streams are divided into individual fragments, with each audio fragment having substantially the same length in time as its corresponding video fragment. The fragments are loaded and played at particular times to enforce synchronization between corresponding fragments (when possible), and elements of the interface are configured to appear, change, and/or disappear at set times. Notably, the present invention ensures that streams the remain synchronized while transitioning from one segment to another.

Figure 1:
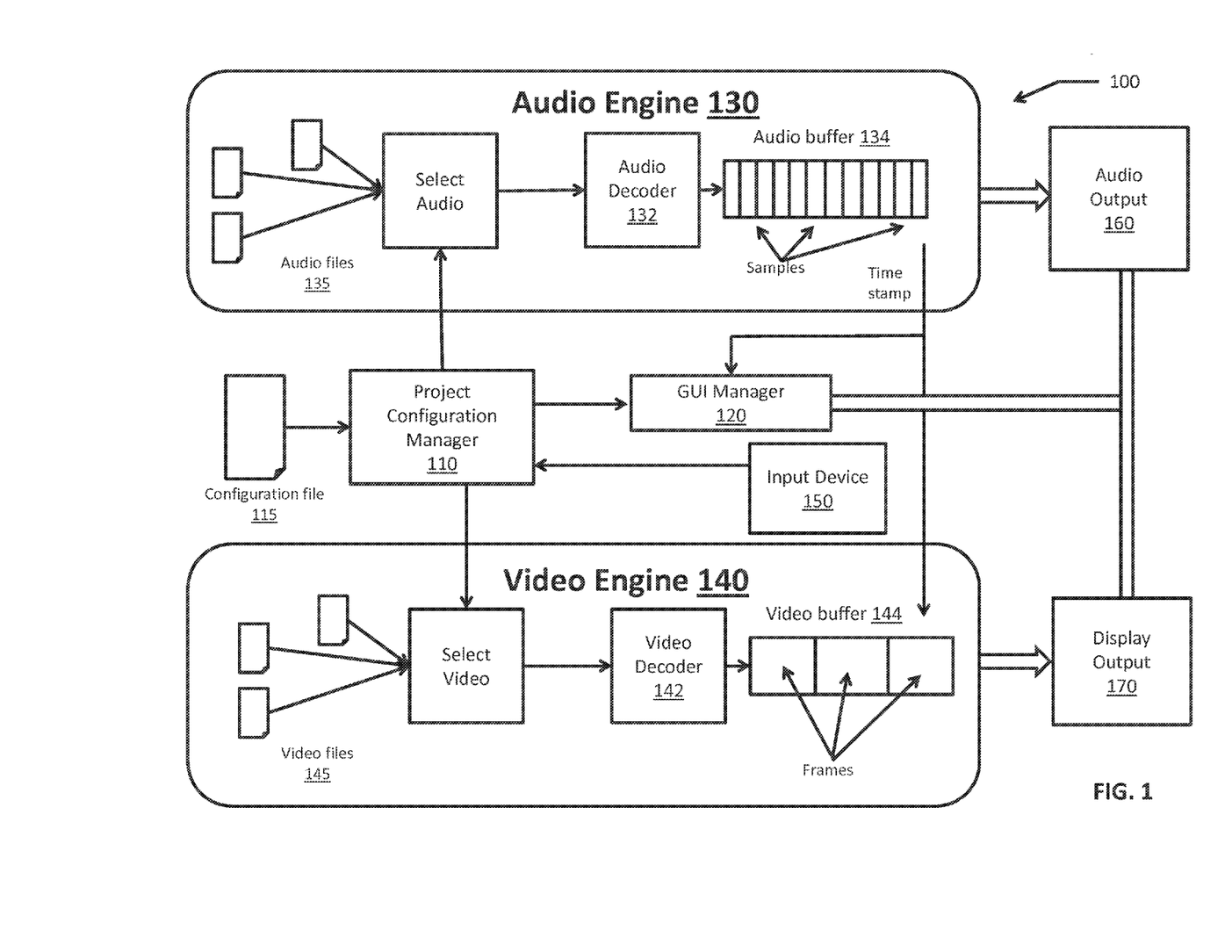
FIG. 1 is an exemplary system component diagram according to an embodiment of the invention.

Referring to FIG. 1, a system 100 for synchronizing audio and video in selectably presentable multimedia content includes a project configuration manager 110, a graphical user interface (GUI) manager 120, an audio engine 130, and a video engine 140. A viewer of the multimedia content may interact with the system using an input device 150, such as a keyboard, mouse, trackball, touchpad, touchscreen, remote, eye tracker or any other suitable input controller. Audio and video are presented to the viewer via audio output 160 and display output 170, respectively. Audio output 160 may include one or more speakers, headphones, and the like. Display output 170 may include, for example, a monitor, tablet computer, television, mobile device screen, and/or projector.

The initial input to the system 100 includes a configuration file 115, one or more audio files 135, and one or more video files 145. The configuration file 115 may define the overall structure of the multimedia content, such as how the multimedia content segments are linked together to form one or more content paths. The configuration file 115 may further specify which audio and video files correspond to each segment; i.e., which audio and video should be played when a particular segment is played or selected by a viewer. Additionally, the configuration file 115 may indicate the interface elements that should be displayed to the viewer, as well as the when the elements should displayed.

In some embodiments, the configuration file 115 is also used in determining which audio and video files should be loaded or buffered prior to being played (or potentially played). Because decision points can occur near the end of a segment, it may be necessary to begin transfer of one or more of the potential next segments to the viewer prior to a selection being made. For example, if a viewer is approaching a decision point with three possible next segments for selection, all three potential segments may be loaded to ensure a smooth transition upon conclusion of the current segment. Intelligent buffering of the video, audio, and/or other media content may be performed as described in U.S. patent application Ser. No. 13/437,164, filed Apr. 2, 2012, and entitled "Systems and Methods for Loading More Than One Video Content at a Time," the entirety of which is incorporated by reference herein.

The project configuration manager 110 coordinates among the GUI manager 120, audio engine 130, and video engine 140. During presentation of the multimedia content to the viewer, the configuration manager 110 references the configuration file 115 to determine the required media files that should be loaded and/or played. This determination may be made prior to playing any content, autonomously while the content is playing, and/or in response to a segment selection made by the viewer. The required media files (e.g., one or more of the audio files 135 and video files 145) are provided to the audio engine 130 and video engine 140, which process them through audio decoder 132 and video decoder 142, respectively, and divide them into fragments. Prior to being played, the decoded audio fragments are placed in audio buffer 134 and the decoded video fragments are placed in video buffer 144. At least some of the audio and video fragments are ultimately sent to the audio output 160 and display output 170, respectively, for synchronized playback to the viewer.

In conjunction with the audio and video processing, the project configuration manager 110 references the configuration file 115 to determine which interface elements should be displayed to the viewer. The configuration file 115 may further indicate the specific timings for which actions may be taken with respect to the interface elements. The configuration manager 110 provides the appropriate interface elements and synchronization timings to the GUI manager 120, which operates to show, modify, and/or hide the elements in accordance with the provided instructions. The interface elements may include, for example, playback controls (pause, stop, play, seek, etc.), segment option selectors (e.g., buttons, images, text, animations, video thumbnails, and the like, that a viewer may interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, may be the amount of time remaining until the current segment will transition to the next segment), links, popups, an index (for browsing and/or selecting other multimedia content to view or listen to), and/or a dynamic progress bar such as that described in U.S. patent application Ser. No. 13/622,795, filed Sep. 19, 2012, and entitled "Progress Bar for Branched Videos," the entirety of which is incorporated by reference herein. In addition to visual elements, the GUI manager 120 may also provide for sounds to be played. For example, a timer may have a "ticking" sound synchronized with the movement of a clock hand. The interactive interface elements may be shared among multimedia segments or may be unique to one or more of the segments.

In response to the potential next segments displayed by the GUI manager 120 during a decision period, the viewer may select the next media segment to view using the input device 150. The selection is received by the project configuration manager 110, which, in response, continues the process of informing the GUI manager 120, audio engine 130, and video engine 140 of the next interface elements, audio files, and video files, respectively, that will need to be processed.

Figures 2A, 2B, 2C:
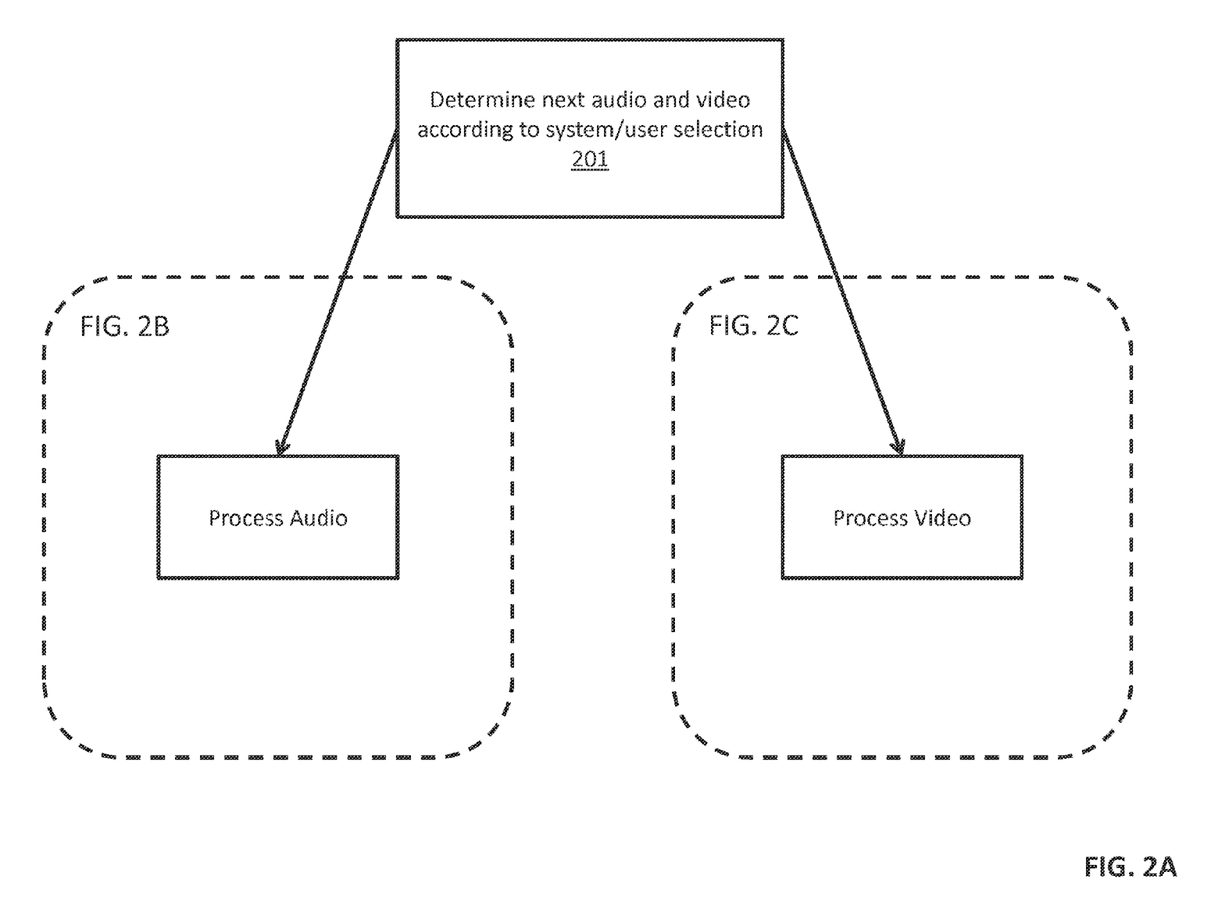
FIG. 2A is an exemplary audio and video processing flowchart according to an embodiment of the invention.
FIG. 2B is an exemplary audio processing flowchart according to an embodiment of the invention.
FIG. 2C is an exemplary video processing flowchart according to an embodiment of the invention.
Figure 2B:
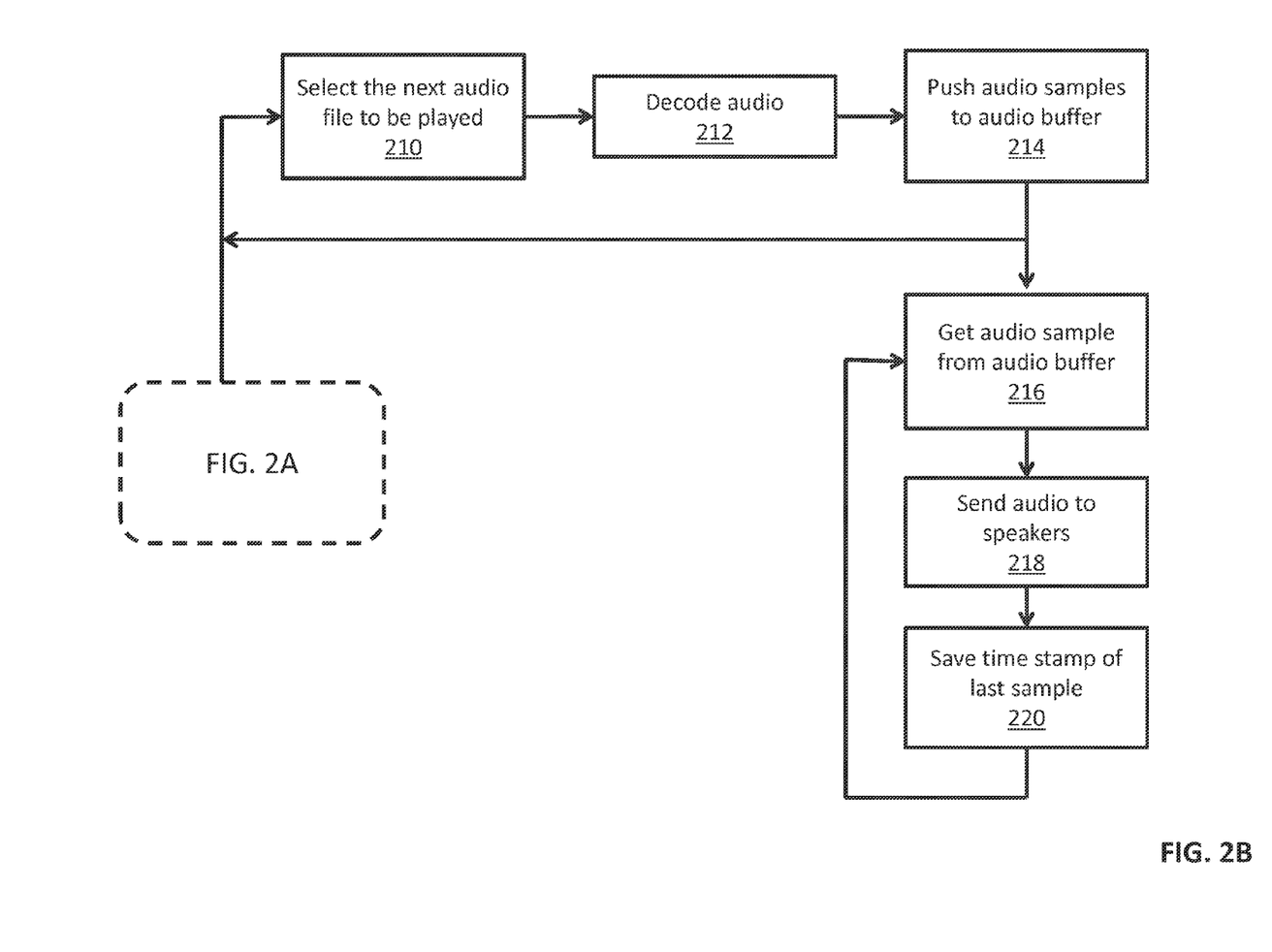
Figure 2C:
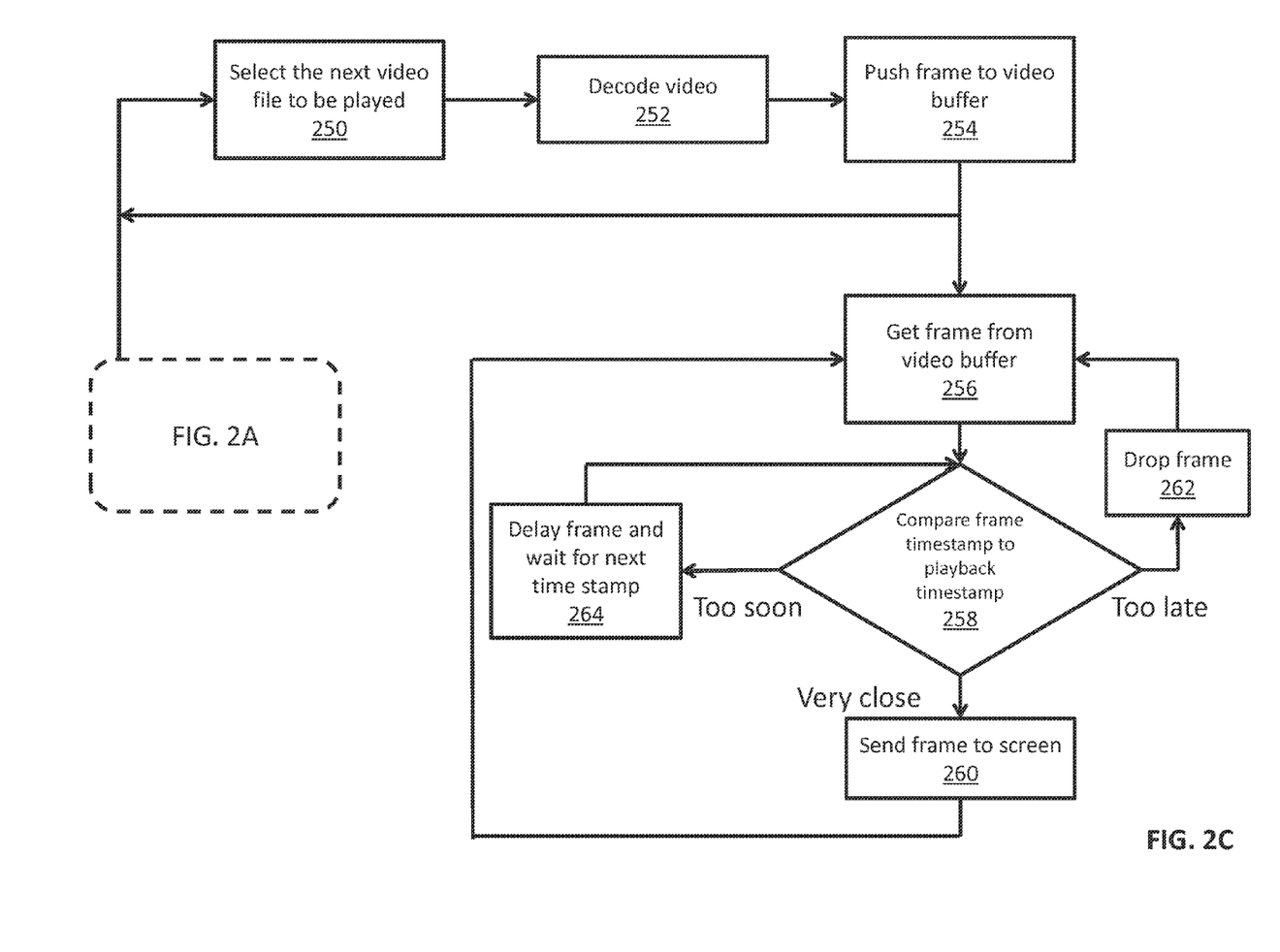

FIGS. 2A-2C depict one embodiment of a method for synchronizing media streams of selectably presentable multimedia content. In Step 201, an initial or next multimedia content segment is determined for playback (and/or buffering) based on a user or automatic system selection. Each multimedia content segment may have one or more associated media streams that must be played in synchronization with each other. As such, upon determining the particular multimedia content segment to be played, the necessary media component files (e.g., audio files in formats such as MP3, WAV, AIF, video file(s) in formats such as MP4, MOV, AVI, FLV, or any other format usable with the present invention) are gathered for decoding. As respectively shown in FIGS. 2B and 2C, at Step 210 the audio file(s) associated with the segment are selected for playback, as are the video file(s) associated with the segment selected at Step 250.

At Step 212, the selected audio file is decoded and divided into one or more audio samples. The total number of samples may depend on the length or file size of the audio file, and each sample may be a fixed length (e.g., 1 second) or a fixed size (e.g., 64 kilobytes). The audio samples (or references thereto) are placed in an audio buffer (e.g., a first-in-first out queue) to await playback (Step 214). Each audio sample includes a timestamp indicating the exact time that the sample should be played. The time of play may be referenced from the beginning of the audio file or other suitable reference point. When it is time for an audio sample to be played, it is retrieved from the buffer (Step 216) and sent to an audio output device (e.g., speakers or headphones) at a sample rate of about 44100 Hz (Step 218). Other fixed or variable bitrates may be used based on the desired or available quality of the audio and/or available bandwidth. Upon sending an audio sample for playback, a current playback timestamp variable is updated with the value of the audio sample timestamp (Step 220). Some or all of the audio file may be played continuously to a viewer in this manner.

At step 252, the selected video file is decoded and divided into one or more video fragments. The total number of fragments may depend on the length or file size of the video file, and each fragment may be a fixed length (e.g., 0.1 seconds) or a fixed size (e.g., 256 kilobytes). The fragments may be individual frames of the video; for example, for a video having a frame rate of 30 fps, each frame is $\frac{1}{30}$ seconds of the video. The video frames (or references thereto) are placed in a video buffer (e.g., a first-in-first out queue) to await playback (Step 254). Each video frame includes a timestamp indicating the exact time that the frame should be displayed. The time of play may be referenced from the beginning of the video file or other suitable reference point.

Unlike the audio stream which is played continuously, however, playback of the video stream is dependent upon synchronization with the audio stream. During playback of the media content, the video frame at the head of the buffer is retrieved (Step 256) and the timestamp associated with the frame is compared to the current playback timestamp value (Step 258). If the difference between the timestamp values falls within an acceptable threshold (i.e., if the timestamps are substantially close), then the frame is sent to an output display device for presentation to the user in synchronization with the audio stream (Step 260). For example, the threshold value may be approximately 50 ms, as a lack of lip synchronization greater than that value may be noticeable to human viewers. Other thresholds may be used, however, depending on the type of video (e.g., animation) or for any other reason. Further, the threshold may vary depending on whether the audio or video has the earlier timestamp. For example, if the audio has an earlier timestamp than the video (i.e., the current playback timestamp is earlier than the video frame timestamp), the maximum allowed threshold may be 15 ms, whereas if the audio has a later timestamp than the video, the maximum allowed threshold may be 45 ms. The frames may be sent at a frame rate of 25 Hz or any other suitable frame rate based on the desired or available quality of the video and/or available bandwidth.

If the timestamp associated with the frame is less than the current playback timestamp and the difference in the timestamps is greater than the acceptable threshold, then the frame is considered to have arrived too late for playback and is dropped (Step 262). The process then returns to Step 256 to retrieve the next frame at the head of the video frame buffer, and the timestamp check is performed again (Step 258). Video frames may be repeatedly dropped until reaching a frame that has a timestamp substantially close to the current playback timestamp. In another embodiment, the timestamp difference between consecutive video frames in the buffer is known. In that case, only the timestamp of the first frame in the buffer is checked, and the number of consecutive frames needing to be dropped can be determined without having to check each individual frame timestamp.

In some embodiments, to avoid noticeable gaps in video when a large number of consecutive frames must be dropped (e.g., more than 10 frames, more than 100 frames, or any suitable value), one or more frames will be sent for display even if their timestamp value would otherwise result in those frames being dropped. As one example, for every 25 consecutive frames that are dropped, one of those frames is sent for display to a viewer. This ensures that at least one frame per second is displayed, while allowing the video to resynchronize with the audio over time.

If the timestamp associated with the frame is greater than the current playback timestamp and the difference in the timestamps is greater than the acceptable threshold, then the frame is considered to have arrived too early for playback and is delayed (Step 264). As describe above, the current playback timestamp is updated as each audio sample is played. Once the current playback timestamp and the frame timestamp become substantially close, the delayed frame is sent for playback. If for some reason the difference in timestamps grows too large as the frame is delayed, the frame may be dropped.

As described above, a graphical user interface may be synched with the audio stream. For example, playback controls, progress bars, content selection controls, timers, and so on, may include timestamps specifying when they should be displayed, activated, and/or hidden. The timestamps may be referenced from the beginning of an associated multimedia content segment, the beginning of the entire multimedia presentation, or any other suitable reference point. As with the video frames, the timestamps of the interface components are compared with the current playback timestamp to determine which action(s) to take with respect to each component. The actions may be similar to those taken for video frames (e.g., display, delay, drop); however, as certain interface components may be critical to a viewer's experience, the acceptable threshold may be larger and/or the dropping of certain actions (e.g., display of the next segment options for selection by the viewer) may not be permitted. The timestamps may also specified when user interactions should be collected (e.g., enabling the component after it is displayed) and/or recorded (e.g., gathering statistics on user interactions with the presentation).

The synchronization process described above continues as the multimedia presentation is played for the viewer. As each subsequent content segment is selected, the associated audio and video files are selected and decoded, if necessary, with the samples/audio being placed in buffers prior to playback. If the viewer seeks to a separate point in the segment or in the entire presentation, the same synchronization process occurs using the audio and video data required for playback of the segment to which the viewer navigated. The process may operate in substantially real-time, receiving the viewer's selections and immediately adding the required audio and video files to the buffers. The buffers may be queues that vary in size but are short enough so that the viewer may experience a change in audio and video almost immediately. In some instances, portions of more than one audio and/or video file may be held in the buffers. This may occur, for example, during a transition from one content segment to the next.

It is to be appreciated that the processing of audio, video, and/or other media content may be performed in parallel, serially, and/or on one or more local or remote processing devices. Further, the methods described herein may include more or fewer steps, and/or the steps may occur in different orders. For example, audio and video files may be divided into fragments before or after a playback selection is made. Further, similar processing may be performed to allow for synchronized playback of streams other than audio and video. In some embodiments, a stream other than the audio stream is used as the continuously played stream, and the other media streams are synchronized against that primary stream. For example, in one embodiment, the video frames are continuously played, the timestamps of the video frames are used to update the current playback timestamp, and samples of the audio stream are dropped, delayed, and/or played as necessary to synchronize with the video.

One skilled in the art will recognize the various forms in which the systems and methods described herein may be implemented. The functions provided by the project configuration manager 110, GUI manager 120, audio engine 130, video engine 140, and/or other components may be implemented in any appropriate hardware or software. If implemented as software, the invention may execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

Some or all of the described functionality may be implemented in a media player and/or other software downloaded to or existing on the viewer's device. Some of the functionality may exist remotely; for example, the audio and video decoding may be performed on one or more remote servers, and the audio and video fragments transmitted to the viewer's device and placed in a buffer. In some embodiments, the viewer's device serves only to provide output and input functionality, with the remainder of the processes being performed remotely.

The local and/or remote software may be implemented on hardware such as a smart or dumb terminal, network computer, personal digital assistant, wireless device, smartphone, tablet, television, game machine, music player, mobile telephone, laptop, palmtop, wireless telephone, information appliance, workstation, minicomputer, mainframe computer, or other computing device, that is operated as a general purpose computer or a special purpose hardware device that can execute the herein described functionality. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in a multi-platform language/framework such as Java, .Net, Objective C, or in native processor executable code. Illustratively, a programming language used may include assembly language, Ada, APL, Basic, C, C++, C#, Objective C, COBOL, dBase, Forth, FORTRAN, Java, Modula-2, Pascal, Prolog, REXX, and/or JavaScript, for example.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The system can include client and servers computers. A client and server are generally remote from each other and typically interact over a communication network. The relationship of client and server arises by virtue of computer programs running on the respective computers and having a client-server relationship to each other.

In various embodiments, the client computers include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the client automatically makes requests with the web browser. Examples of commercially available web browser software are Microsoft® Internet Explorer®, Mozilla® Firefox®, and Apple® Safari®.

In some embodiments, the client computers include client software. The client software provides functionality to the client that provides for the implementation and execution of the features described herein. The client software may be implemented in various forms, for example, it may be in the form of a web page, widget, and/or Java, JavaScript, .Net, Silverlight, Flash, and/or other applet or plug-in that is downloaded to the client and runs in conjunction with the web browser. The client software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software. The client software may also be in the form of a standalone application, implemented in a multi-platform language/framework as described above.

A communications network may connect the clients with the servers. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used Although internal components of the computer are not shown, those of ordinary skill in the art will appreciate that such components and the interconnections are well known. Accordingly, additional details concerning the internal construction of the computers need not be disclosed in connection with the present invention.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for synchronizing audio and video of selectably presentable multimedia content, the system comprising:
  a memory for storing a plurality of selectably presentable multimedia content segments, each content segment defining a portion of one or more content paths and comprising a decision period during which a user may select a subsequent content segment as the content segment is playing;
  an assembly engine for seamlessly assembling a subset of the content segments into a multimedia presentation comprising one of the content paths;
  a configuration manager for determining an audio file and a video file to be played based on a selected subsequent content segment;
  an audio engine for processing the audio file for playback, the processing comprising:
    dividing the audio file into a plurality of audio samples, each audio sample comprising a timestamp indicating a time at which the audio sample should be played; and
    upon causing one of the audio samples to be played, updating a current system timestamp based on the timestamp of the played audio sample; and
  a video engine for synchronizing playback of the video file with the playback of the audio file, the synchronizing comprising:
    dividing the video file into a plurality of video frames, each video frame comprising a timestamp indicating a time at which the video frame should be played;
    comparing the timestamp of at least one of the video frames with the current system timestamp to determine that the video frame timestamp is earlier than the current system timestamp;
    discarding the at least one of the video frames based on the timestamp comparison;
    repeating the comparing and discarding functions with consecutive video frames until reaching a video frame having a timestamp that is substantially close to the current system timestamp; and
    determining that a maximum number of video frames has been consecutively discarded, and causing a next video frame to be played irrespective of a timestamp associated with the next video frame.

2. The system of claim 1, wherein the synchronizing further comprises:
  comparing the timestamp of a second one of the video frames with the current system timestamp to determine that the timestamp of the second video frame is substantially close to the current system timestamp; and
  causing the second video frame to be immediately played.

3. The system of claim 1, wherein the synchronizing further comprises:
  comparing the timestamp of a second one of the video frames with the current system timestamp to determine that the timestamp of the second video frame is later than the current system timestamp; and
  delaying the second video frame.

4. The system of claim 1, further comprising a graphical user interface manager for presenting to the user, during a decision period as a content segment is playing, visual representations of two or more alternative content segments from which a subsequent content segment may be selected by the user.

5. The system of claim 4, wherein the graphical user interface manager is further for presenting to the user, upon reaching the decision period, a visual representation of a time interval representing an amount of time permitted to select one of the alternative content segments.

6. The system of claim 1, wherein the memory is further for storing a plurality of audio files, a plurality of video files, and a configuration file; and wherein determining the audio file and the video file to be played comprises:

selecting the audio file from the plurality of audio files based on the configuration file and a selected multimedia content segment; and selecting the video file from the plurality of video files based on the configuration file and the selected multimedia content segment.

7. A method of synchronizing audio and video of selectably presentable multimedia content, the method comprising:

storing a plurality of selectably presentable multimedia content segments, each content segment defining a portion of one or more content paths and comprising a decision period during which a user may select a subsequent content segment as the content segment is playing;

determining an audio file and a video file to be played based on a selected subsequent content segment;

seamlessly appending the selected subsequent content segment onto a currently playing content segment;

processing the audio file for playback, the processing comprising:

dividing the audio file into a plurality of audio samples, each audio sample comprising a timestamp indicating a time at which the audio sample should be played; and upon causing one of the audio samples to be played, updating a current system timestamp based on the timestamp of the played audio sample; and synchronizing playback of the video file with the playback of the audio file, the synchronizing comprising:

dividing the video file into a plurality of video frames, each video frame comprising a timestamp indicating a time at which the video frame should be played;

comparing the timestamp of at least one of the video frames with the current system timestamp to determine that the video frame timestamp is earlier than the current system timestamp;

discarding the at least one of the video frames based on the timestamp comparison;

repeating the comparing and discarding functions with consecutive video frames until reaching a video frame having a timestamp that is substantially close to the current system timestamp; and determining that a maximum number of video frames has been consecutively discarded, and causing a next video frame to be played irrespective of a timestamp associated with the next video frame.

8. The method of claim 7, wherein the synchronizing further comprises:

comparing the timestamp of a second one of the video frames with the current system timestamp to determine that the timestamp of the second video frame is substantially close to the current system timestamp; and causing the second video frame to be immediately played.

9. The method of claim 7, wherein the synchronizing further comprises:

comparing the timestamp of a second one of the video frames with the current system timestamp to determine that the timestamp of the second video frame is later than the current system timestamp; and delaying the second video frame.

10. The method of claim 7, further comprising presenting to the user, during a decision period of the currently playing content segment, visual representations of two or more alternative content segments from which the subsequent content segment is selected.

11. The method of claim 10, further comprising presenting to the user, upon reaching the decision period, a visual representation of a time interval representing an amount of time permitted to select one of the alternative content segments.

12. The method of claim 7, further comprising storing a plurality of audio files, a plurality of video files, and a configuration file; and wherein determining the audio file and the video file to be played comprises:

selecting the audio file from the plurality of audio files based on the configuration file and the selected subsequent content segment; and selecting the video file from the plurality of video files based on the configuration file and the selected subsequent content segment.

* * * * *